United States Patent [19]

Tonomoto

[11] Patent Number: 5,021,831
[45] Date of Patent: * Jun. 4, 1991

[54] FILTER FOR REMOVING SMOKE AND TONER DUST USED IN ELECTROPHOTOGRAPHIC/ELECTROSTATIC RECORDING APPARATUS

[75] Inventor: Yoshihiro Tonomoto, Kawasaki, Japan

[73] Assignee: Fujitsu Limited, Kawasaki, Japan

[*] Notice: The portion of the term of this patent subsequent to Jul. 3, 2007 has been disclaimed.

[21] Appl. No.: 475,343

[22] Filed: Feb. 5, 1990

Related U.S. Application Data

[62] Division of Ser. No. 128,054, Dec. 3, 1987, Pat. No. 4,938,786.

[51] Int. Cl.$^5$ ............................................. G03G 21/00
[52] U.S. Cl. ................................... 355/215; 55/103; 55/316; 55/155; 55/524; 55/528; 55/487
[58] Field of Search ............... 55/103, 124, 155, 487, 55/524, 528, 316; 355/215

[56] References Cited

U.S. PATENT DOCUMENTS

| | | | |
|---|---|---|---|
| 2,400,180 | 5/1946 | Venable | 183/73 |
| 2,804,937 | 9/1957 | Poole | 183/70 |
| 3,252,274 | 5/1966 | Benson et al. | 55/377 |
| 3,505,794 | 4/1970 | Nutter et al. | 55/498 |
| 3,570,224 | 3/1971 | Clemens | 55/374 |
| 3,672,126 | 6/1972 | Goettle | 55/106 |
| 3,982,043 | 9/1976 | Simpson | 427/14 |
| 4,069,026 | 1/1978 | Simm et al. | 55/6 |
| 4,127,681 | 11/1978 | Ferren et al. | 427/100 |
| 4,188,197 | 2/1980 | Amberkar et al. | 55/482 |
| 4,215,682 | 8/1980 | Kubik et al. | 55/103 |
| 4,323,374 | 4/1982 | Shinagawa et al. | 55/132 |
| 4,357,150 | 11/1982 | Masuda et al. | 55/6 |
| 4,382,440 | 5/1983 | Kapp et al. | 55/486 |
| 4,588,537 | 5/1986 | Klaase et al. | 264/22 |
| 4,702,753 | 10/1987 | Kowalczyk | 55/267 |
| 4,737,173 | 4/1988 | Kudirka et al. | 55/276 |
| 4,938,786 | 7/1990 | Tonomoto | 55/103 |

FOREIGN PATENT DOCUMENTS

| | | |
|---|---|---|
| 963621 | 7/1950 | France . |
| 58-83879 | 5/1983 | Japan . |
| 62-83016 | 4/1987 | Japan . |
| 292479 | 6/1929 | United Kingdom . |
| 824448 | 8/1957 | United Kingdom . |
| 900450 | 7/1962 | United Kingdom . |
| 1513699 | 6/1978 | United Kingdom . |

*Primary Examiner*—Bernard Nozick
*Attorney, Agent, or Firm*—Staas & Halsey

[57] ABSTRACT

In an electrophotographic/electrostatic recording apparatus especially for high speed recording, a toner image on a recording sheet is fused thereon by a flash lamp in a fixing unit, and smoke is generated thereby. Smoke and toner dust in the ambient air should be removed before it is exhausted out of the apparatus by drawing the air through an air filter. The invention discloses that is it effective to use an air filter structure comprising a plurality of filter units, wherein a first filter unit made of electrostatically charged fibrous material is utilized at the inlet side of the air filter. The first filter unit has a comparatively greater porosity and attracts and removes toner particles charged with the opposite polarity to that of the electrostatically charged fibrous material. Therefore, the air, a substantial part of toner dust being removed therefrom, can more easily enter into the following filter units for removal of smoke, resulting in increased endurance of the air filter.

14 Claims, 8 Drawing Sheets

FILTER FOR REMOVING SMOKE AND TONER DUST USED IN ELECTROPHOTOGRAPHIC/ELECTROSTATIC RECORDING APPARATUS

This is a divisional of copending application(s) Ser. No. 07/128,054 filed on 12/3/87, now U.S. Pat. No. 4,938,786.

BACKGROUND OF THE INVENTION

1. Field of the Invention

This invention is related to an air filter for removing smoke and dust generated in image recording such in an electrophotographic or electrostatic recording apparatus. More particularly, this invention is related to an air filter used in the recording apparatus wherein a toner image is formed on a recording sheet and is fixed by a fixing means a flash lamp type.

2. Description of the Prior Art

In an electrophotographic/electrostatic recording apparatus such as a printer, a copying machine and the like, a toner image is formed on a recording sheet and subsequently fixed by a fixing means.

In the electrophotographic recording apparatus, an electrostatic latent image is formed on a photosensitive drum by an optical means and developed by a developer, thereafter the latent image is transformed into a toner image on the recording sheet. In the electrostatic recording apparatus, the electrostatic latent image is formed electrostatically on a membrane by a stylus electrode and is transformed into the toner image on the recording sheet. However, the fixing means, in other words, fusing means is almost the same.

A fixing means comprising two heat rollers is generally used, whereby the recorded sheet is moved between two rollers and the toner image is fixed by heat under the pressure of the rollers. However, with an increases in of recording speed, a fixing means utilizing a method of flash lamp heating, has been introduced which does not use heat rollers. This method generates smoke during the fixing process and it becomes necessary to provide an air filter which removes smoke and other dust such as toner particles, from the exhaust duct between the fixing means and an exhaust blower.

When tone particles comprising generally dye and resin materials are fused in the fixing process, they evaporate into several kinds of gases, resulting the forming of smoke.

In the prior art, the smoke thus generated is removed by the air filter. The air filter consists of one or preferably plural filter units, each being formed of glass fiber, synthetic fiber or the like and each having a different priority. The filter units are stacked in cascade in the path of flowing exhaust air in the order of porosity, the one having the largest opening being located at an upstream side of the air flow.

Figure 1A:
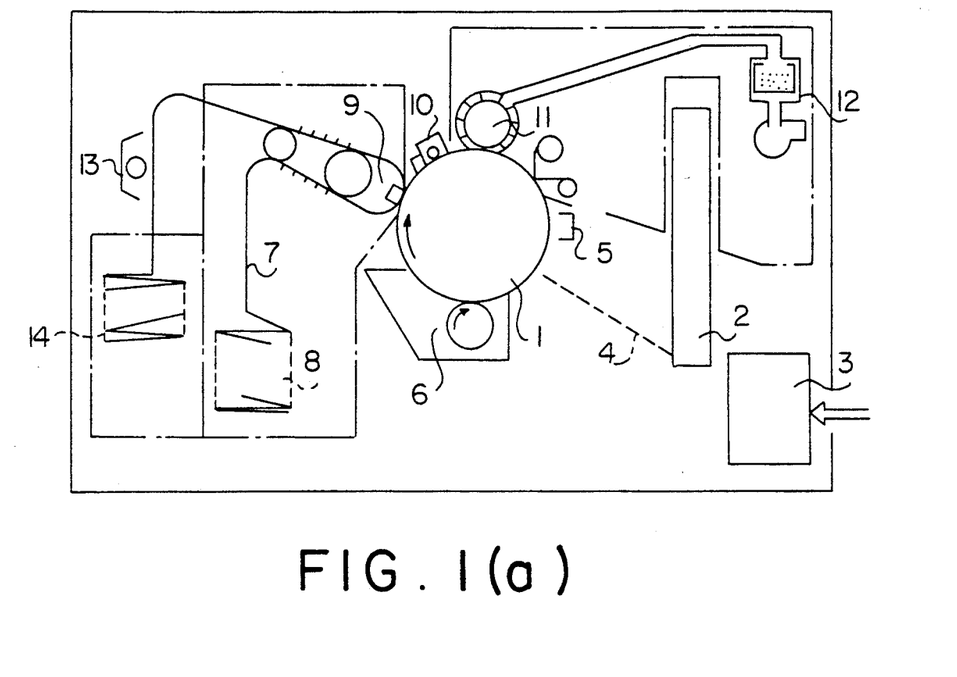
FIGS. 1(a) and 1(b) show schematic cross sections of a laser printer in order to explain the principles of an electrophotographic recording apparatus.
Figure 1B:
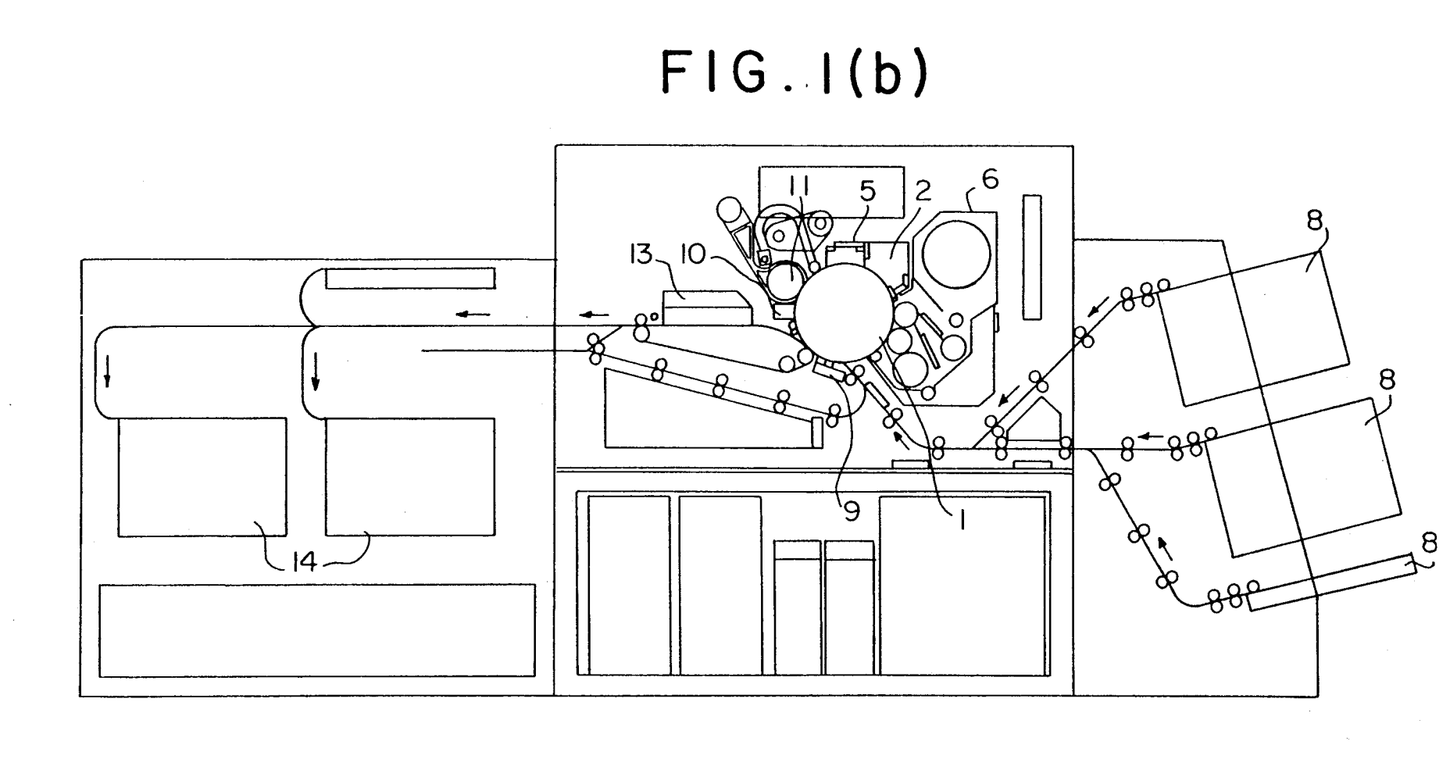

FIGS. 1(a) and 1(b) show schematic cross sections of a laser printer to explain the principle of electrophotographic recording technology and explain where the air filter is installed. In FIG. 1(a), photosensitive drum 1, the surface thereof being coated with photosensitive material, is provided and the drum is rotatable in a direction of an arrow. Optical unit 2 including a laser source, a lens unit, and a reflector (these are not shown) irradiates light 4 onto the surface of drum 1 from one end to the other end thereof, where the light is controlled by a signal corresponding to the printing image from buffer unit 3 which is connected a device such as a central processing unit or microcomputer.

Photosensitive drum 1 is electrostatically charged uniformly by corona charger 5 before the drum rotates to the exposure position of light 4 from optical unit 2. In this process, the charged surface of drum 1 forms an electrostatic latent image corresponding to the printing image. When the drum is further rotated, its surface is subject to developing unit 6 which contains toner particles, thereby the electrostatic latent image is transformed into a toner image. With further rotation of drum 1, the toner image is transferred to a recording sheet 7, which is fed from hopper 8 and transported to transferring unit 9. The surface of drum 1 is further rotated and exposed to discharger 10, and then the remaining toner particles are brushed off by cleaning brush 11 and recovered in collecting unit 12. Recording sheet 7 having the transferred toner image thereon is further moved to fixing unit 13, and stored in stacker 14.

The fundamental structure of FIG. 1(b) is almost the same as shown in FIG. 1(a), except that a cut sheet is used as a recording sheet. The reference numerals used in FIG. 1(b) show the same or like parts as shown in FIG. 1(a). Hoppers 8 store cut sheets of different sizes, and each cut sheet is moved along the arrows to transferring unit 9 and then to fixing unit 13 and finally stored in stacker 14.

Fixing unit 13, of a conventional heat roller type, is utilized in an electrophotographic recording apparatus having a low printing speed. In this case, the air filter is not needed (in FIGS. 1(a), 1(b), the air filter is not used), it is sufficient to exhaust warmed air out of the apparatus. When a high speed of printing is required, a fixing unit of the flash lamp type is utilized and the air filter has to be installed in the exhaust path to remove smoke generated in the fixing process.

Figure 2:
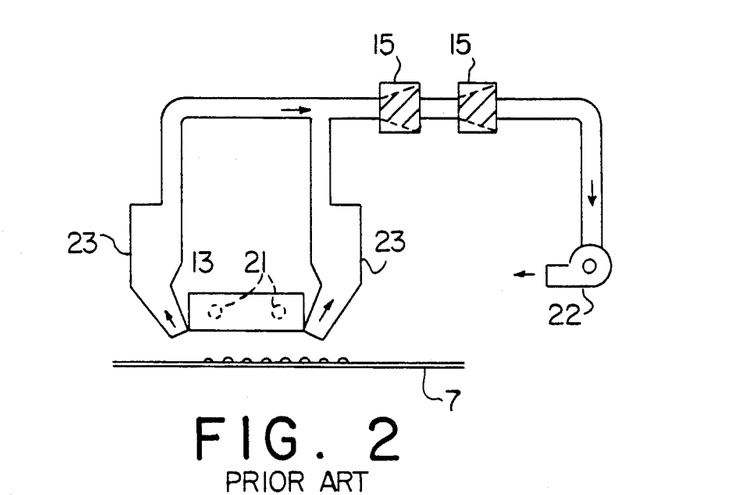
FIGS. 2 and 3 show examples of an air filter arrangement of the prior art, especially illustrating the filter position relative to the fixing unit and exhaust duct.
Figure 3:
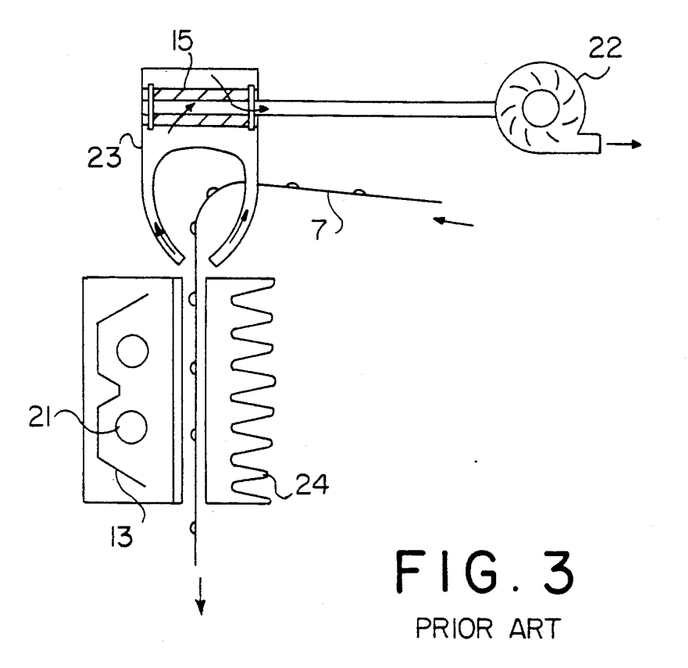

In the prior art, the air filter is installed such as shown in FIGS. 2 or 3. FIG. 2 is disclosed in Japanese Patent Application Kokai 56-54467, 14.5.1981 by H. Ishikawa et al, and FIG. 3 is disclosed in Japanese Patent Application Kokai 58-83879, 19.5.1983 by Y. Ito et al. In FIG. 2, recording sheet 7 is exposed to a fixing unit 13 comprising two flash lamps 21, and smoke is sucked into duct 23 by blower 22. Two air filters 15 are provided in cascade in the flow path of the air. In FIG. 3, cylindrical air filter 15 is provided above fixing unit 13 and radiator 24, and recording sheet 7 is coming into duct 23 through an opening on the right side thereof and running downward and vertically between fixing unit 13 and heat radiator 24. Minute smoke particles are captured in air filter 15.

However, in the electrophotographic/electrostatic recording apparatus, especially, utilizing the toner developer of dry type as explained above, a lot of toner particles are inherently floating in the ambient atmosphere. These toner particles, the size of which are usually greater than that of smoke particles are also attracted to the air filter and clog up the filter openings increasing resistance against air flow. Therefore the filtering of the air filter deteriorates rapidly in a very short time.

SUMMARY OF THE INVENTION

It is an object of the invention, therefore to provide an air filter which can endure for a longer period of operation while filtering air including smoke and toner dust.

It is another object of the invention to provide the air filter having substantially the same size and similar structure to conventional filters.

These objects are accomplished by utilizing a filter unit made of fibrous dielectric material coated with an electrostatically chargeable agent thereon, or fibrous dielectric material embedding electrostatic charges therein. The filter has a specific porosity size in order to allow the dust particles without an electric charge to flow freely therethrough, the particle size being smaller than the specific porosity. This filter unit is arranged at the entrance side of the incoming air and is stacked with other conventional filter units having no electrostatic charge therein.

A fibrous dielectric material coated with an electrostatically chargeable agent is fabricated by coating a solution of a chemical material dissolved into methyl ethyl ketone on fibrous dielectric material and thereafter. As the chemical material, vinylidene fluoride is used for a positively charged toner, and styrene acrylic, for a negatively charged toner. The fibrous dielectric material described above is charged by friction with toner particles or molecules of flowing air during operation.

On the other hand, fibrous dielectric material having embedded electrostatic charges is often called "fibrous electret". Generally fibrous electret is defined as a permanently charged or polarized piece of dielectric material produced by heating the material and placing it in a strong electric field while cooling. However, many different methods are also applied for manufacturing fibrous dielectric material embedding electrostatic charges, wherein the name "fibrous electret" is not used.

Fibrous material have embedded electrostatic charges is discussed in Japanese Patent Application Kokai such as 54-113900, 5.9.1979; 55-67313, 21.5.1980; 60-168510, 2.9.1985; 60-168511, 2.9.1985; 61-46215, 6.3.1986 and etc.

Hereinafter, fibrous dielectric material coated with an electrostatically chargeable agent or fibrous dielectric material embedding electrostatic charges is referred to briefly as "electrostatically charged fibrous material".

When a filter unit of with an electrostatically charged fibrous material is arranged at the first stage of the air filter, it attracts electrostatically charged toner particles of opposite polarity. A substantial fraction of toner particles in the air is removed therefrom, and smoke having a particle size thereof being smaller than that of the toner particles, enters into the subsequent filter units where it is removed.

Figure 4:
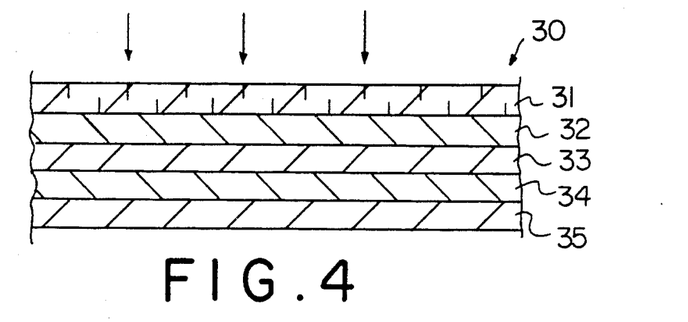
FIG. 4 shows a partial cross section of an air filter to explain the principle of the present invention.
Figure 5A:
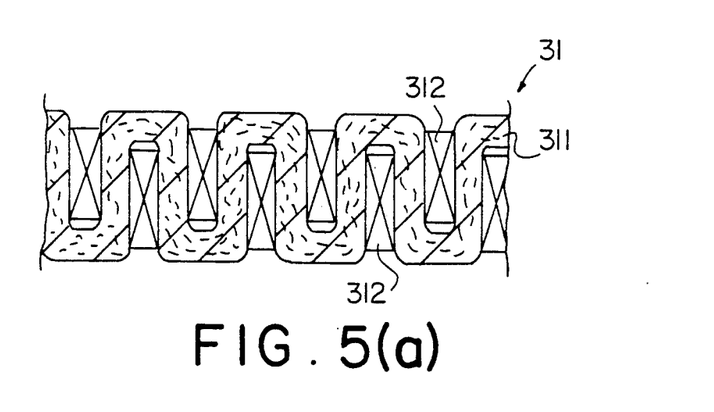
FIGS. 5(a) and 5(b) show an enlarged sectional view and top view respectively of a first filter unit of FIG. 4 according to the present invention.
Figure 5B:
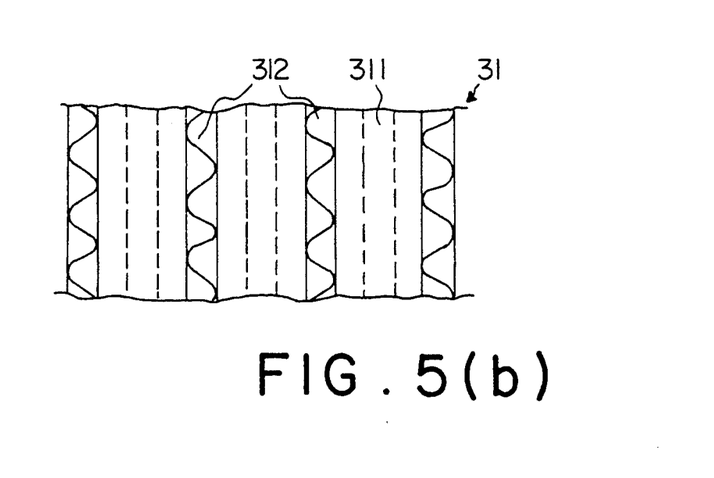

In order to explain the principle of the present invention, FIG. 4 and FIGS. 5(a) and 5(b) are used. FIG. 4 shows a partial cross section of air filter 30 according to the present invention. Air filter 30 consists of five filter units 31 to 35. Each stacked filter unit is assumed to be flat, and the air including smoke and toner dust flows into the air filter 30 from the top, goes through filter units 31 to 35 and is exhausted. FIGS. 5(a) and 5(b) show an enlarged sectional view and top view respectively of first filter unit 31.

The first filter unit 31 of air filter 30 comprises folded sheet 311 made of electrostatically charged fibrous material to obtain a wider filter surface and separator 312, which is a corrugated metal sheet. Separator 312 is inserted between waves of folded sheet 311, the separator being arranged in parallel with each other. Each filter unit from the second to fifth 32 to 35 is made of conventional fibrous material such as glass fiber or synthetic fiber having no electrostatic charge, and is stacked or laminated in the order of the specified porosities of the filter unit. The filter unit on the outlet side or fifth filter unit 35 of FIG. 4 has the least amount of porosity.

If the toner particles are charged positively during a recording operation, the first filter unit 31 is made of electrostatically charged fibrous material capable of attracting positive toner particles, the fibrous material being coated with vinylidene fluoride solution or embedded with electrostatic charges of negative polarity. If toner particles are charged negatively, the fibrous material is coated with styrene acrylic solution or embedded with electrostatic charges of positive polarity. During operation, most of the toner particles ar attracted to the wide surface of folded sheet 311, and the air from first filter unit 31 including smoke and the remaining toner flows into second filter unit 32. Smoke particles are filtered out in the order of particle size during the flow to the fifth filter unit 35.

Further objects and advantages of the present invention will be apparent from the following description, reference being had to the accompanying drawings wherein preferred embodiments of the present invention are clearly shown.

BRIEF DESCRIPTION OF THE DRAWINGS

Throughout the drawings, the same reference numerals designate and identify the same or similar parts.

DETAILED DESCRIPTION OF THE PREFERRED EMBODIMENTS

Figure 6:
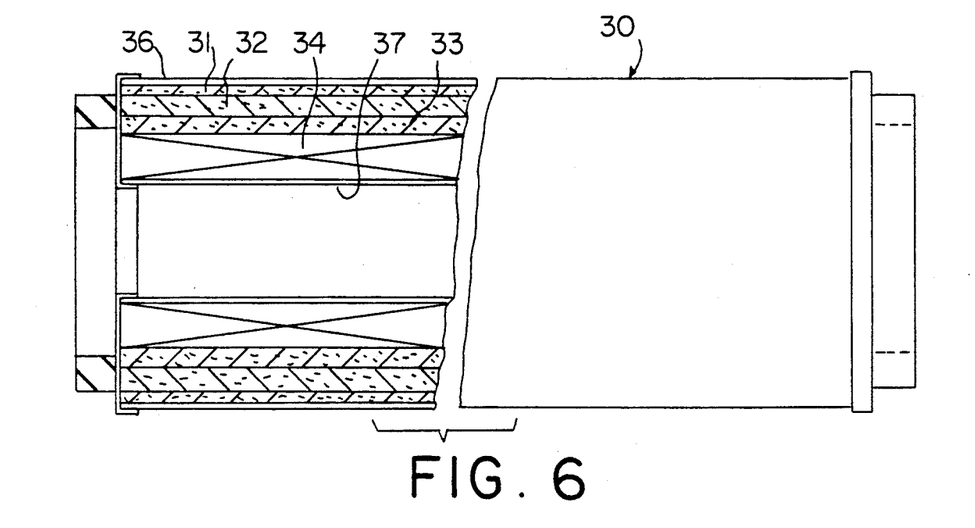
FIG. 6 is a side elevation view of the preferred embodiment, partially in cross section, of a cylindrical air filter according to the present invention.
Figure 7:
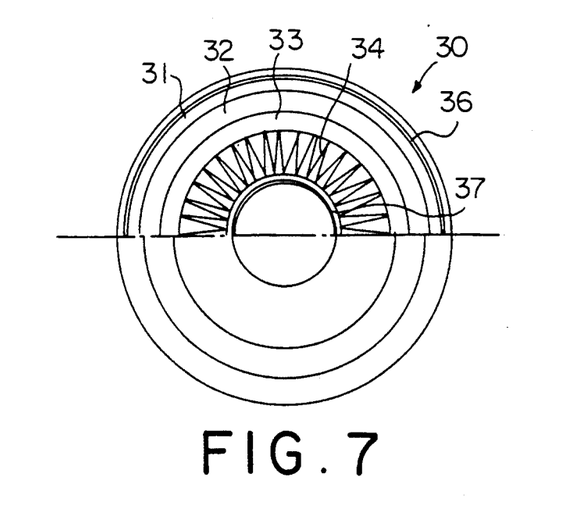
FIG. 7 shows an end view, partially in cross section, of the air filter of FIG. 6.

FIG. 6 is a side elevation view, partially in cross section, of a cylindrical air filter 30 of the present invention. FIG. 7 is an end view, partially in cross section, of the air filter of FIG. 6. The outermost filter unit 31 of electrostatically charged fibrous material according to the present invention is utilized, and toner particles of opposite polarity are attracted thereto. Second filter unit 32 and third filter unit 33 are composed of conventional glass fiber or synthetic fiber. Filter unit 32, is arranged adjacent to the inside surface of filter unit 31, and filter unit 33 is arranged adjacent to the inside surface of filter unit 32. And further, fourth material unit 34 made of sheet filter is formed in a corrugated shape and is arranged inside of filter unit 33. These four filter units comprise air filter 30 and are supported by two thin aluminum mesh support cylinders 36 and 37, each support cylinder having a large mesh size.

When an average toner particle size of 10 micron is used for developing, each filter unit is required to have a specific porosity such as 10 to 20 microns for filter unit 31, 5 to 10 microns for filter unit 32, 5 microns for filter unit 33 and less than 1 micron for filter unit 34. Herein, the porosity of each filter unit is defined such as that most of the dust particles having a size larger than the above specified values would be filtered out.

Figure 8:
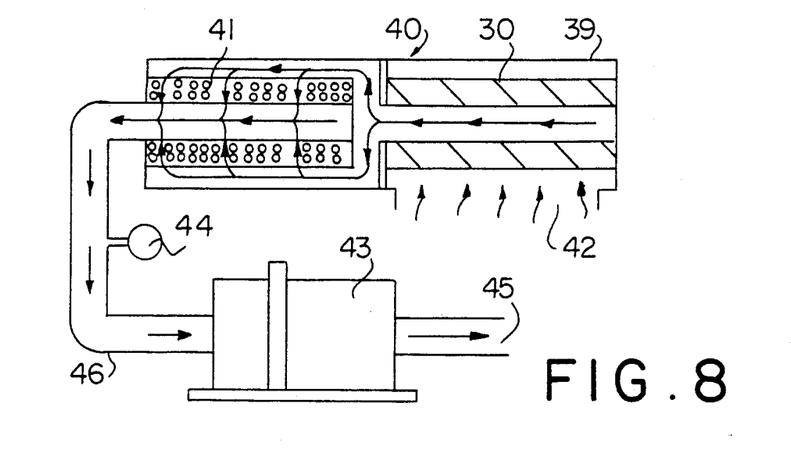
FIG. 8 illustrates schematically the arrangement of the filter assembly of the present invention with a deodorizing unit.

FIG. 8 illustrates schematically the arrangement of air filter 30 in a filter system installed in an electrophotographic/electrostatic recording apparatus. Air filter 30 is disposed in casing 39 together with a deodorization filter 41 arranged axially in series, both filters forming filter assembly 40. Casing 39 has an opening 42 which draws in ambient air including smoke and toner dust therethrough when the filter system is driven by blower 43, and air flows into air filter 30 from a lower portion of the cylindrical surface of casing 39. After smoke and dust are removed, the air flows into the adjacent chamber for deodorization along the path shown by arrows. Deodorization is achieved when air flows through deodorization filter 41 composed of activated carbon particles. Filtered air is discharged from outlet 45 of blower 43 to the outside of the apparatus. Pressure sensor 44 is provided in the exhaust duct 46, which acts to stop the printing operation when air filter 30 clogs with smoke and toner dust.

Figure 9:
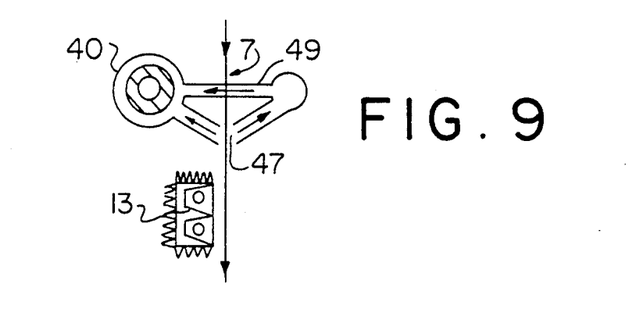
FIG. 9 shows the relative arrangement of the filter assembly, the fixing unit, and recording sheet.

The relative arrangement of the filter system with respect to fixing unit 13 of FIG. 1(a) is shown in FIG. 9. Recording sheet 7 comes down vertically and its left-side surface is irradiated by flash lamps in fixing unit 13. The heated ambient air including smoke and toner dust rises and is drawn into inlets 47 disposed on both sides of recording sheet 7 and flows into filter assembly 40 through connecting duct 49.

Figure 10:
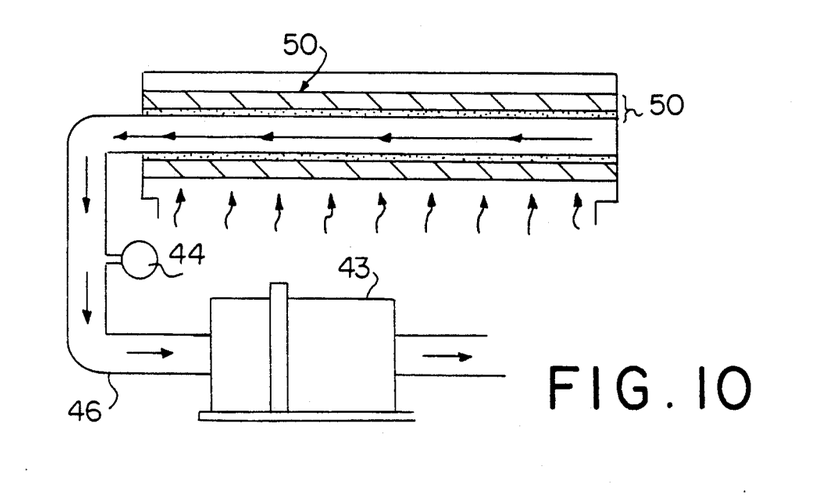
FIG. 10 shows another type of filter assembly of the present invention, in which a deodorization filter is integrated with the air filter.
Figure 11:
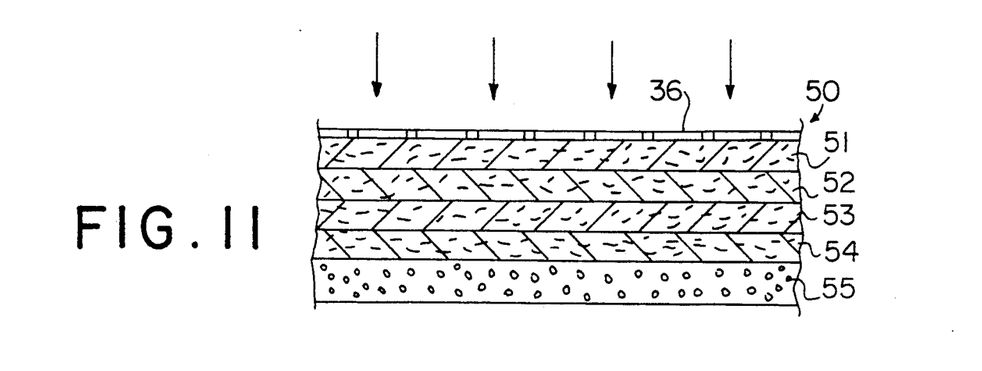
FIG. 11 shows a partial cross sectional view of the cylindrical air filter shown in FIG. 10.

FIG. 10 shows an arrangement using another type of filter assembly 50, in which a deodorization filter is integrated with air filter for smoke and toner dust. The detailed structure is shown in FIG. 11 which shows a partial cross sectional view of a wall portion of cylindrical filter assembly 50. The structure of aluminum support cylinder 36 and four filter units 51 to 54 are almost the same as shown in FIG. 6. Inside these filter units, deodorization filter 55 is provided.

Figure 12:
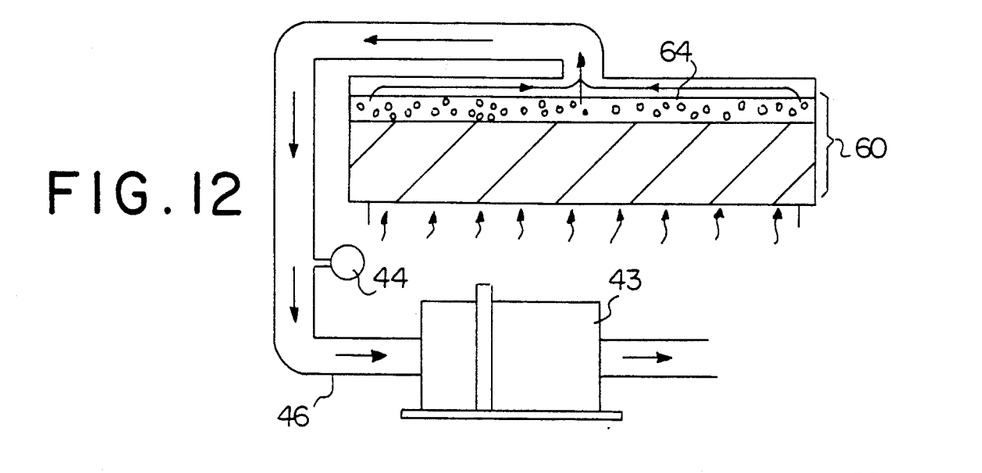
FIG. 12 shows still another arrangement of a filter assembly of the present invention in which a planar type of filter unit is utilized.
Figure 13:
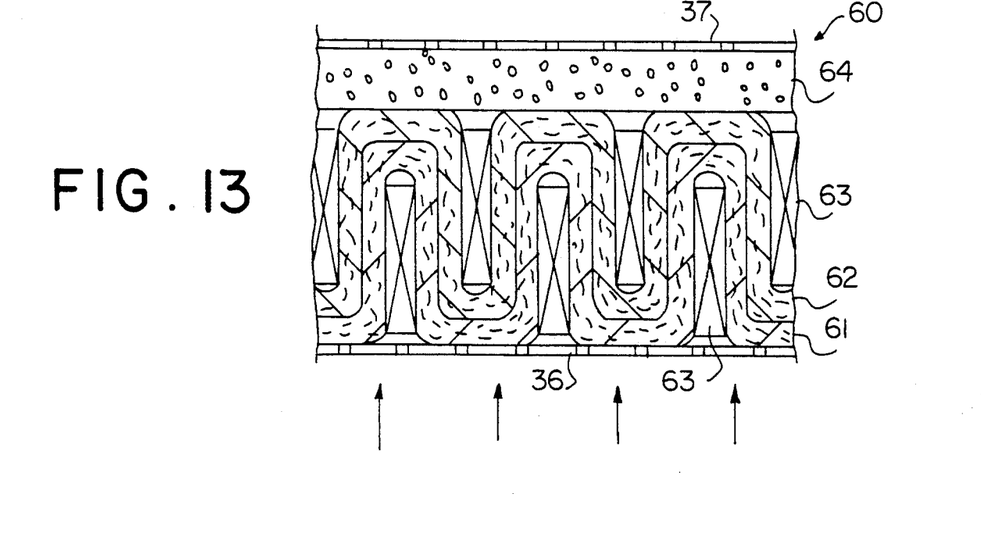
FIG. 13 shows a partial cross section of the filter assembly shown in FIG. 12, and FIGS. 14(a) and 14(b) illustrate experimental results using the filter assembly according to the present invention, where

FIG. 12 shows another arrangement for a case when a wider filter surface is required, and a planar type of filter assembly 60 is utilized. A partial cross section is shown in FIG. 13. Filter assembly 60 is also an integrated type supported by two aluminum mesh support cylinders 36 and 37 and comprises filter unit 61 of electrostatically charged fibrous material, filter unit 62 of conventional glass fiber, and planar deodorization filter 64. Air is drawn in from the bottom side thereof. Filter units 61 and 62 are laminated and then folded using a separator 63 of a metal sheet material.

The three types of filters shown in FIGS. 8, 10 and 12 are selectively used depending on the recording speed of the apparatus. When a high speed of recording is required, it is preferred to apply a filter assembly such as FIG. 12 type, because it is easy to design a filter assembly having a wider surface. Of these three types, the first filter layer such as shown by reference numerals 31, 51, or 61 of FIGS. 5(a), 11 and 13, respectively is made of electrostatically charged fibrous material according to the present invention. Air drawn into a filter assembly including smoke and toner dust is filtered at first by the first filter units 31, 51 or 61 respectively, and toner particles, the size thereof being comparatively larger than that of smoke particles, are attracted by the electrostatic force of the first filter unit and stick thereto. The air including smoke and remaining uncollected toner dust can easily penetrate through openings formed by metal sheet 312 or 63 such as shown in FIGS. 5(a), 5(b) or FIG. 13 respectively, and reach the surface of the second filter unit. Because most toner particles are collected by the first filter unit, clogging phenomena for the subsequent filter units is remarkably reduced. Durability of the air filter can therefore be much improved.

Figure 14A:
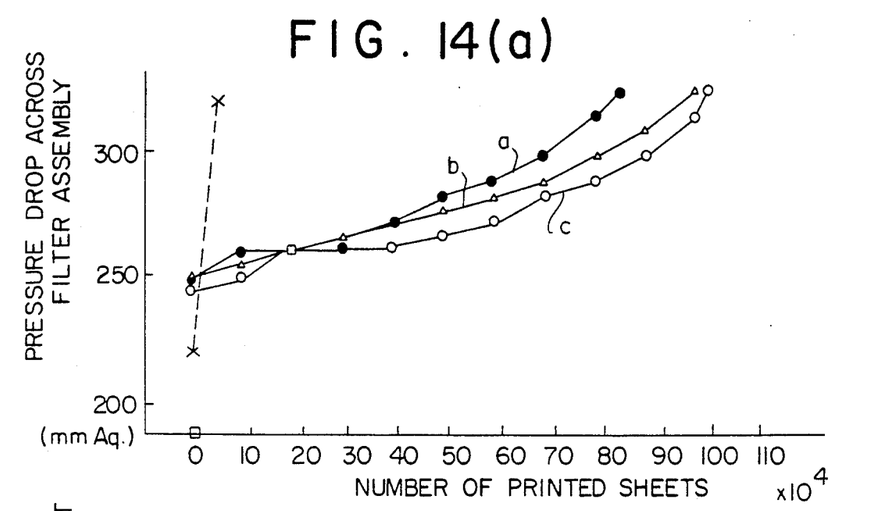
FIG. 14(a) illustrates a relationship between a number of printing sheets and pressure drop across the filter assembly, and 14(b) a relation between a number of printing sheets and weight of the collected smoke and dust.
Figure 14B:
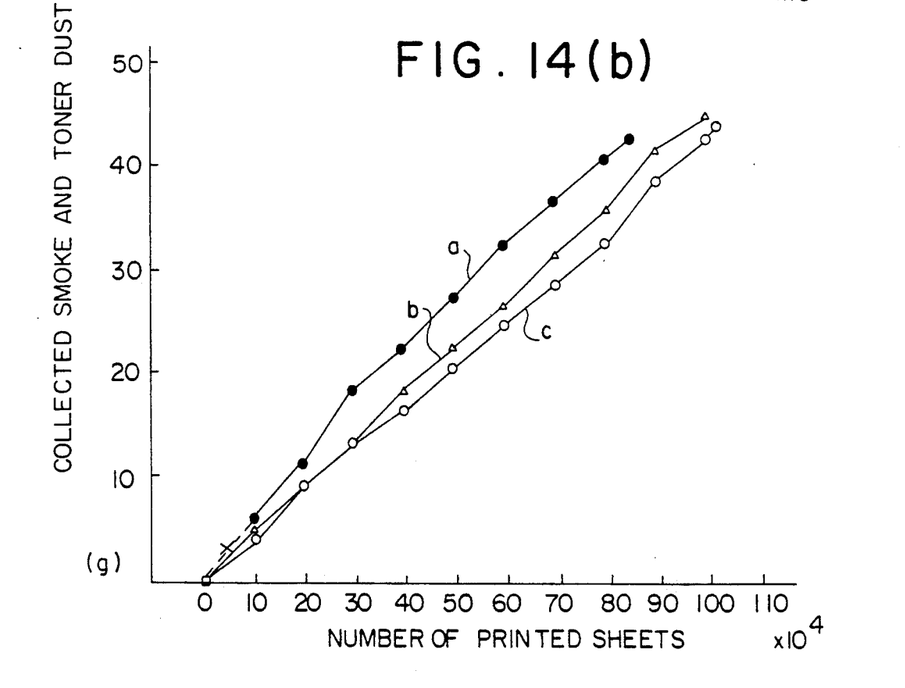

Experimental results using the filter assembly according to the present invention are shown in FIGS. 14(a) and 14(b), where FIG. 14(a) illustrates a relationship between a number of printed sheets and pressure drop across the filter assembly, and FIG. 14(b) a relation between a number of printed sheets and the weight of the collected smoke and toner dust. The experiment is carried out three times for the air filter according to the present invention as shown by curves shown as a, b, and c. After approximately one million sheets of printing, smoke and toner dust of more than 40 grams are collected and the pressure drop shows an increase from about 250 mm Aq. to 330 mm Aq. On the contrary, when the conventional filter assembly of the prior art is used, the pressure drop rises rapidly from 220 mm Aq. to 320 mm Aq. only after about 50,000 sheets with very little collection of smoke and toner dust (shown by dashed line and cross marks).

Only three embodiments of the filter assembly are disclosed, however, the present invention may be embodied in other specific forms such as combined with other types of filter units, without departing from the spirit or essential characteristics thereof. The present invention has a specific feature in that the first filter unit is made of electrostatically charged fibrous material in order to collect charged dust particles at the front end of the filter assembly. The presently disclosed embodiments are therefore to be considered in all respects as illustrative and not restrictive, the scope of the invention being indicated by the appended claims, rather than the forgoing description, and all changes which come within the meaning and range of equivalents of the claims are, therefore, to be embraced therein.

What is claimed is:

1. An electrophotographic/electrostatic recording apparatus, wherein a toner image is formed on a recording sheet, the recording apparatus generating smoke and toner dust particles in air, the toner dust particles having a predetermined average toner particle size and including toner particles having a charge, the recording apparatus comprising:

a fixing unit for fusing the toner image to the recording sheet to fix the toner image on the recording sheet;

a flash lamp connected to said fixing unit; and an air filter having an air inlet side, positioned to remove the smoke and toner dust particles from the air and including a first filter unit disposed at the air inlet side and having a first outlet side, and at least a second filter unit disposed at the first outlet side of said first filter unit and having a second outlet side;

said first filter unit comprising electrostatically charged fibrous material attracting the charged toner particles and having a polarity opposite to the charged toner particles, said first filter unit having a first predetermined porosity greater than the predetermined average toner particle size; and said second filer unit comprising fibrous material without an electrostatic charge and having a second predetermined porosity less than the predetermined average toner particle size.

2. An electrophotographic/electrostatic recording apparatus as recited in claim 1, wherein said toner particles are both large and fine and have the predetermined average toner particle size of about 10 microns and include toner particles charged with a positive polarity, wherein said first filter unit includes negatively charged fibrous material for attracting the charged toner particles, and the first predetermined porosity greater than about 10 microns for removing a substantial part of the large toner dust particles from the air and for allowing the fine toner dust particles and smoke to pass therethrough, respectively, and wherein fibrous material of said second filter unit has a second porosity less than about 10 microns for removing the fine toner particles and smoke.

3. An electrophotographic/electrostatic recording apparatus as recited in claim 2, wherein said charged fibrous material is made of a fibrous dielectric material and a solution coating of vinylidene flouride and methyl ethyl ketone coated onto said fibrous material.

4. An electrophotographic/electrostatic recording apparatus as recited in claim 1, wherein said toner particles are both large and fine and have the predetermined average toner particle size of about 10 microns and include toner particles charged with a negative polarity, wherein said first filter unit includes positively charged fibrous material for attracting the charged toner particles, and the first predetermined porosity greater than about 10 microns for removing a substantial part of the large toner dust particles from the air and for allowing the fine toner dust particles and smoke to pass therethrough respectively, and wherein fibrous material of said second filter unit has a second porosity less than about 10 micron, for removing the fine toner particles and smoke.

5. An electrophotographic/electrostatic recording apparatus as recited in claim 4, wherein said charged fibrous material is made of a fibrous dielectric material and a solution coating of styrene acrylic and methyl ethyl ketone coated onto said fibrous material.

6. An electrophotographic/electrostatic recording apparatus as recited in claims 1, 4 or 2, wherein said air filter further comprises a deodorization filter unit for deodorizing the air adjacent to said first and second filter units, said deodorization filter unit comprising activated carbon particles and being disposed at an exhaust side of said air filter.

7. An electrophotographic/electrostatic recording apparatus as recited in any of claims 1, 4, 2 or 5, wherein said first and second filter units comprise a planar structure.

8. An electrophotographic/electrostatic recording apparatus as recited in any of claim 1, 4, 2 or 5, wherein said first and second filter units comprise a cylindrical structure.

9. An electrophotographic/electrostatic recording apparatus as recited in any of claims 1, 4, 2, 5 or 3, wherein said first filter unit further comprises a separator of folded corrugated material.

10. An electrophotographic/electrostatic recording apparatus as recited in any of claims 1, 4, 2, 5 or 3, wherein said air filter further comprises at least a third filter unit disposed between the second filter unit and an outlet side, said third filter unit including fibrous material without an electrostatic charge, said uncharged fibrous material having a third predetermined porosity less than the porosity of the second filter unit.

11. An electrophotographic/electrostatic recording apparatus as recited in claim 10, wherein said first, second and third filter units comprise a planar structure.

12. An electrophotographic/electrostatic recording apparatus as recited in claim 10, wherein said first, second and third filter units comprise a cylindrical structure.

13. An electrophotographic/electrostatic recording apparatus, including an air filter for removing smoke and toner dust particles from air, wherein said apparatus forms a toner image on a recording sheet by fusing the toner image to the recording sheet, the toner dust particles being both large and fine, having a predetermined average toner particle size of about 10 microns, and having a negative charge, said air filter having an air inlet side, the apparatus comprising:

a flash lamp for fusing the toner image to the recording sheet;

a first filter unit disposed at the air inlet side and having a first outlet side, and at least a second filter unit disposed at the first outlet side of said first filter unit and having a second outlet side;

said first filter unit including positively electrostatically charged fibrous material for attracting the negatively charged toner particles, said firs filter unit having a first predetermined porosity greater than about 10 microns for removing the large toner dust particles from the air and for allowing the fine toner dust particles and smoke to pass therethrough; and said second filter unit including fibrous material without an electrostatic charge and having a second predetermined porosity less than about 10 microns for removing the fine toner dust particles and smoke.

14. An air filter for removing smoke and toner dust particles from air, the toner dust particles being both large and fine, having a predetermined average toner particle size of about 10 microns, and being charged with a positive polarity, said air filter having an air inlet side and an air outlet side and comprising:
(a) a first filter unit disposed at the air inlet side of the air filter; and
(b) at least a second filter unit disposed between said first filter unit and said air outlet side;
wherein said first filter unit includes a negatively electrostatically charged fibrous material for attracting the positively charged toner particles, and a fist predetermined porosity greater than about 10 microns for removing a substantial part of the large toner dust particles from the air and for allowing the fine toner dust particles and smoke to pass therethrough; and
wherein said second filter unit includes fibrous material without an electrostatic charge, said uncharged fibrous material having a second predetermined porosity less than about 10 microns for removing the fine toner dust particles and smoke.

* * * * *

UNITED STATES PATENT AND TRADEMARK OFFICE
CERTIFICATE OF CORRECTION

PATENT NO. : 5,021,831

DATED : JUNE 4, 1991

INVENTOR(S) : YOSHIHIRO TONOMOTO

It is certified that error appears in the above-identified patent and that said Letters Patent is hereby corrected as shown below:

Col. 1,   line 14, after "such" insert --as--;
              line 38, delete "an";
              line 39, delete "of";
              line 48, after "resulting" insert --in--;
              line 54, "priority" should be --porosity--.

Col. 2,   line  1, after "connected" insert --to--;
              line 60, after "Therefore" insert --filtering
                              of--;
              line 61, delete "filtering of the".

Col. 3,   line 34, "have" should be --having--;
              line 43, delete "of".

Col. 4,   line 12, "charged negatively, the" should be
                       --charged. The--;
              line 15, "ar" should be --are--.

Col. 5,   line 15, delete "material";
              line 16, "filter" should be --material--.

UNITED STATES PATENT AND TRADEMARK OFFICE
CERTIFICATE OF CORRECTION

PATENT NO. : 5,021,831

DATED : JUNE 4, 1991

INVENTOR(S) : YOSHIHIRO TONOMOTO

It is certified that error appears in the above-identified patent and that said Letters Patent is hereby corrected as shown below:

Col. 6, line 42, after "and" insert --the--;
       line 62, "forgoing" should be --foregoing--.

Col. 7, line 22, "filer" should be --filter--.

Col. 8, line 54, "firs" should be --first--.

Col. 9, line 10, "fist" should be --first--.

Signed and Sealed this

Twenty-fourth Day of November, 1992

Attest:

DOUGLAS B. COMER

*Attesting Officer*    *Acting Commissioner of Patents and Trademarks*